(12) United States Patent
Jang et al.

(10) Patent No.: US 6,364,348 B1
(45) Date of Patent: Apr. 2, 2002

(54) SIDE AIRBAG SYSTEM AND METHOD FOR MANUFACTURING THE SAME

(75) Inventors: Myun-reun Jang, Gyunggi-do; Hong-bae Choi, Kangwon-do; hyun-joong Lee, Gyungg-do, all of (KR)

(73) Assignee: Delphi Automotive Systems Sungwoo Corp. (KR)

( * ) Notice: Subject to any disclaimer, the term of this patent is extended or adjusted under 35 U.S.C. 154(b) by 0 days.

(21) Appl. No.: 09/620,458

(22) Filed: Jul. 21, 2000

(30) Foreign Application Priority Data

| Feb. 1, 2000 | (KR) | ............................................... 00-4958 |
| Feb. 1, 2000 | (KR) | ............................................... 00-4959 |
| Feb. 15, 2000 | (KR) | ............................................... 00-7155 |

(51) Int. Cl.⁷ .............................................. B60R 21/22
(52) U.S. Cl. .................................. 280/730.2; 280/743.2
(58) Field of Search .......................... 280/728.1, 728.2, 280/730.2, 732, 729, 743.1, 743.2

(56) References Cited

U.S. PATENT DOCUMENTS

| 5,547,214 A | | 8/1996 | Zimmerman, II et al. ................ 280/730.2 |
| 5,556,127 A | * | 9/1996 | Hurford et al. .......... 280/730.2 |
| 5,586,782 A | | 12/1996 | Zimmerman, II et al. ................ 280/730.2 |
| 5,687,988 A | * | 11/1997 | Storey et al. ............. 280/728.2 |
| 5,776,566 A | * | 7/1998 | Mace et al. ................ 428/34.5 |
| 5,803,486 A | * | 9/1998 | Spencer et al. .......... 280/728.2 |
| 5,845,935 A | * | 12/1998 | Enders et al. ............. 280/743.2 |
| 5,853,191 A | * | 12/1998 | Lachat ....................... 280/730.2 |
| 5,860,673 A | | 1/1999 | Hasegawa et al. ........ 280/730.2 |
| 5,895,070 A | * | 4/1999 | Crimmins et al. ........ 280/730.2 |
| 5,913,536 A | * | 6/1999 | Brown ....................... 280/730.2 |
| 6,022,044 A | * | 2/2000 | Cherry ....................... 280/730.2 |
| 6,059,311 A | * | 5/2000 | Wipasuramonton et al. ..... 280/729 |
| 6,065,772 A | * | 5/2000 | Yamamoto et al. ....... 280/730.2 |
| 6,070,904 A | * | 6/2000 | Ozaki et al. ............... 280/743.1 |
| 6,073,959 A | * | 6/2000 | Heinz et al. ................ 280/729 |
| 6,076,091 A | * | 7/2000 | Heinz et al. ............. 280/728.3 |
| 6,106,004 A | * | 8/2000 | Heinz et al. ................ 280/729 |
| 6,142,507 A | * | 11/2000 | Okuda et al. ............. 280/730.2 |

FOREIGN PATENT DOCUMENTS

WO    WO 99/21738    5/1999    ........... B60R/21/22

* cited by examiner

*Primary Examiner*—J. J. Swann
*Assistant Examiner*—L. Lum
(74) *Attorney, Agent, or Firm*—Fish & Richardson P.C.

(57) ABSTRACT

Disclosed are a side airbag system, and manufacturing and folding methods of the side airbag system, by which a passenger's head and thorax can be safely protected, and manufacturing cost and labor can be reduced. The side airbag system has an airbag cushion and an inflator assembly. The airbag cushion has a first panel, a pair of second panels, and pairs of reinforcement panels. The airbag cushion has an upper chamber and a lower chamber partitioned by a tether. The inflator assembly has an inflator, a mounting ring, and a mounting bracket. The tether constantly maintains a pressure in and a shape of the airbag cushion so that a gas injected by the inflator is filled in the lower chamber prior to the upper chamber.

10 Claims, 17 Drawing Sheets

SIDE AIRBAG SYSTEM AND METHOD FOR MANUFACTURING THE SAME

BACKGROUND OF THE INVENTION

1. Field of the Invention

The present invention relates to a side airbag system for vehicles, and more particularly to a side airbag system, which has an integrated tether, and manufacturing and folding methods of the side airbag system, by which a passenger's head and thorax can be safely protected, and manufacturing cost and labor can be reduced.

2. Discussion of the Related Art

In general, passengers, including drivers, who utilize an automobile of a grand and high-quality style, pay much attention to not only the performance of the automobile, but also the safety system for protecting the passengers from injury in the event of an accident. Such safety systems include a safety belt, an airbag system, a steering safety-shaft, etc., which are designed to protect the passengers as best as possible by automatically operating in the event of an accident.

Especially, the airbag system instantly injects an exploding gas into an airbag cushion when the automobile experiences a collision or a rapid decrease of speed. Then, the rapidly expanding airbag cushion surrounds the front or the side of a passenger, so as to prevent the passenger from coming into collision with hard objects such as a front glass or a steering wheel of an automobile.

Several airbag systems functioning as above have been disclosed by U.S. Pat. Nos. 5,938,232, 5,860,673, 5,586,782, and 5,547,214, all of which disclose side airbag systems for protecting the drivers and the passengers from the lateral collision of the automobile.

FIG. 1 shows a construction of a conventional side airbag system, which includes a side impact airbag module 10 disposed at a frame 4 of a front seat 1.

The front seat 1 generally includes a seat back 2 and a seat cushion 3. The seat back 2 has a plurality of seams 6a, 6b, and 6c. The seat back 2 also has at least a wing 7 sewed at a part of the seat back 2 by the seams 6a, 6b, and 6c and extending forward therefrom.

FIG. 2 is a sectional view taken along line C—C of FIG. 1, which shows that the side impact airbag module 10 includes an airbag cushion 15 and an inflator 11.

The side impact airbag module 10 is disposed in an inner space of a foam layer 5 which is surrounded by front and rear panels 2a and 2b of the seat back 2 and front and rear panels 7a and 7b of the wing 7.

The inflator 11 has an inflator housing 14 and is fixed to the frame 4 by a bolt and a nut. The frame 4 is a pipe extending in an axial direction of the seat back 2. A first safety beam 4a extending forward of the wing 7 is fixed to the frame 4, and is firmly assembled with a second safety beam 4b. Further, the bolt penetrates through the inflator housing 14 and the first safety beam 4a to be firmly tightened by the nut, so as to firmly fix the inflator 11 to the first safety beam 4a.

The airbag cushion 15 is assembled with the inflator 11 while being folded in a compacted way. The airbag cushion 15 is inflated by a gas generated by the inflator 11 when the car comes into lateral collision. While the airbag cushion 15 is being inflated, the airbag cushion 15 breaks through the seams 6a, 6b, and 6c of the wing 7 to protrude forward from a lateral side of the seat back 2, thereby protecting a passenger's or a driver's thorax and head.

As shown in FIG. 3, the airbag cushion 15 is made by seaming a plurality of strips or panels 30b to 30f of a conventional flexible material. When the airbag cushion 15 has been inflated, it has a shape of a cylinder, nearly like a rectangular box.

The airbag cushion 15 is divided into a plurality of compartments 40b to 40f to form a plurality of chambers 50b to 50f, so as to minimize the loss of pressure in the airbag cushion 15 and at the same time maintain the inflated shape of the airbag cushion 15 as best as possible when the passenger's thorax and head collide with the airbag cushion 15. Since the chambers 50b to 50f of the airbag cushion 15 are respectively filled with the gas injected from the inflator 11, the airbag cushion 15 is shaped like a plurality of airbag cushions partitioned one from another. The construction of the airbag cushion 15 as described above is intended to overcome a difficulty of the general airbag cushion stitching process in that the panels 30b to 30f must be stitched, manually turned inside out, and then stitched again by means of a sewing machine or a like machine of fabrication equipment.

However, in the conventional side airbag system, the side impact airbag module requires a firm fixing construction between the inflator and the frame. This is because the airbag cushion, compactedly folded, violently shakes while inflating due to the high gas pressure.

Moreover, in the conventional side airbag system, although the partitioned airbag is stitched in a flat plane, both ends of a panel, a middle portion of another panel, or a predetermined portion of a panel must be individually stitched, in order to ensure that the portion functioning as a tether is formed in the airbag cushion. Therefore, in the conventional side airbag system, the efficiency is relatively low in stitching the airbag cushion, and this low efficiency increases the manufacturing cost.

Also, in the conventional side airbag system, the airbag cushion is in contact with the inflator in the state of being folded and stored. Therefore, the gas of high temperature directly comes into contact with the airbag cushion to generate thermal deformation of the airbag cushion when the gas is injected from the inflator. In order to secure a structural safety from such a thermal deformation, the airbag cushion employs panels which are relatively thick and coated overall. These coated thick panels also increase the manufacturing cost.

In addition, since the conventional airbag cushion is folded simply like an accordion, it is not competent in smoothly and uniformly dispersing the gas of high temperature and high pressure into each chamber in an initial stage of operation. Furthermore, in the conventional airbag cushion, it is difficult to control the distribution of pressure in the different chambers, when the passengers come into contact with the airbag cushion.

SUMMARY OF THE INVENTION

Accordingly, the present invention has been made in an effort to solve the problems occurring in the related art, and it is an object of the present invention to provide a side airbag system, which has an airbag cushion stitched in a flat plane, so as to protect a passenger by preventing an initial loss of gas pressure in an inflator depending on the portion of the passenger coming into contact with the airbag cushion.

It is another object of the present invention to provide a method for manufacturing a side airbag system, by which panels can be stitched in a flat plane to easily form an integrated tether, thereby making it easy to manufacture the side airbag system, and reducing the manufacturing cost.

It is another object of the present invention to provide a method for folding a side airbag system, by which the airbag cushion can be folded corresponding to the introducing direction of the gas of high temperature and high pressure and stored in the airbag housing, so as to maximize the operation efficiency of the airbag system.

In accordance with one aspect, the present invention provides a side airbag system for protecting a passenger of an automobile from injury in the event of a lateral collision to the automobile, the side airbag system comprising:

a frame of a seat of the automobile, the frame having a fixing plate;

an airbag cushion including a first panel, a pair of second panels, and pairs of reinforcement panels, the first panel having a tether at which a plurality of vents are formed, the second panels being seamed with the first panel along first seams of the first panel, each pair of the reinforcement panels being stacked onto and seamed with each of the second panels along second seams of the second panels, the airbag cushion having an upper chamber and a lower chamber partitioned by the tether; and an inflator assembly installed in the airbag cushion, the inflator assembly including an inflator, a mounting ring, and a mounting bracket, the mounting ring being made by winding a metal strip having a predetermined width and overlapping ends of the metal strip, the inflator being inserted through the mounting ring and then assembled with the mounting bracket, the inflator assembly having assembling bolts inserted through bolt holes of the lower chamber and being assembled to the fixing plate of the frame, wherein the tether constantly maintains a pressure in and a shape of the airbag cushion so that a gas injected by the inflator is filled in the lower chamber prior to the upper chamber.

In accordance with another aspect, the present invention provides a method for manufacturing a side airbag system for protecting a passenger of an automobile from injury in the event of a lateral collision to the automobile, the method comprising the steps of:

stacking a first panel, a pair of second panels, and pairs of reinforcement panels in sequence;

coinciding side ends of the panels one from another and symmetrically arranging the second panels and the reinforcement panels;

stitching the first and the second panels along a first seam on the first panel;

stitching the second panels and the reinforcement panels stacked together along second seams on the second panels;

folding the first panel upward and folding the second panels and the reinforcement panels downward; and stitching the first panel, the second panels and the reinforcement panels together along third seams at a periphery of the side airbag system.

In accordance with another aspect, the present invention provides a method for folding a side airbag system for protecting a passenger of an automobile from injury in the event of a lateral collision to the automobile, the method comprising the steps of:

folding a first panel, a pair of second panels, and pairs of reinforcement panels at a right angle with reference to first and second folding lines, and folding the panels in an opposite direction;

forming a folded body having a section of a shape including horizontally continuous S letters by repeating the previous folding step;

folding an upper body of the folded body toward a lower body of the folded body to be overlapped with each other;

bending upward the upper body and the lower body overlapped together; and surrounding the bent folded body with a cover.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Hereinafter, described in detail will be several preferred embodiments of the present invention, with reference to the accompanying drawings.

Figure 1:
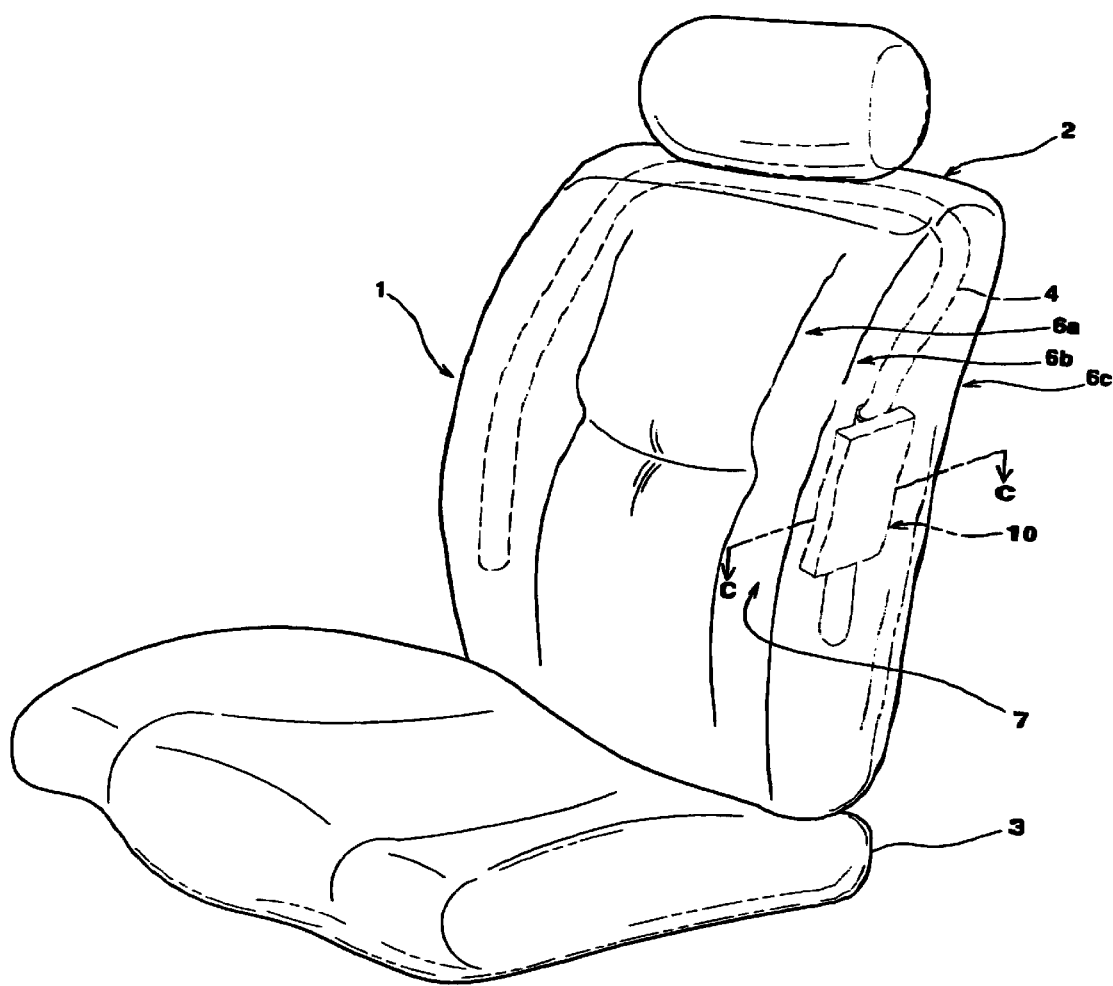
FIG. 1 shows a perspective view of a front seat of an automobile having a conventional side airbag system.
Figure 2:
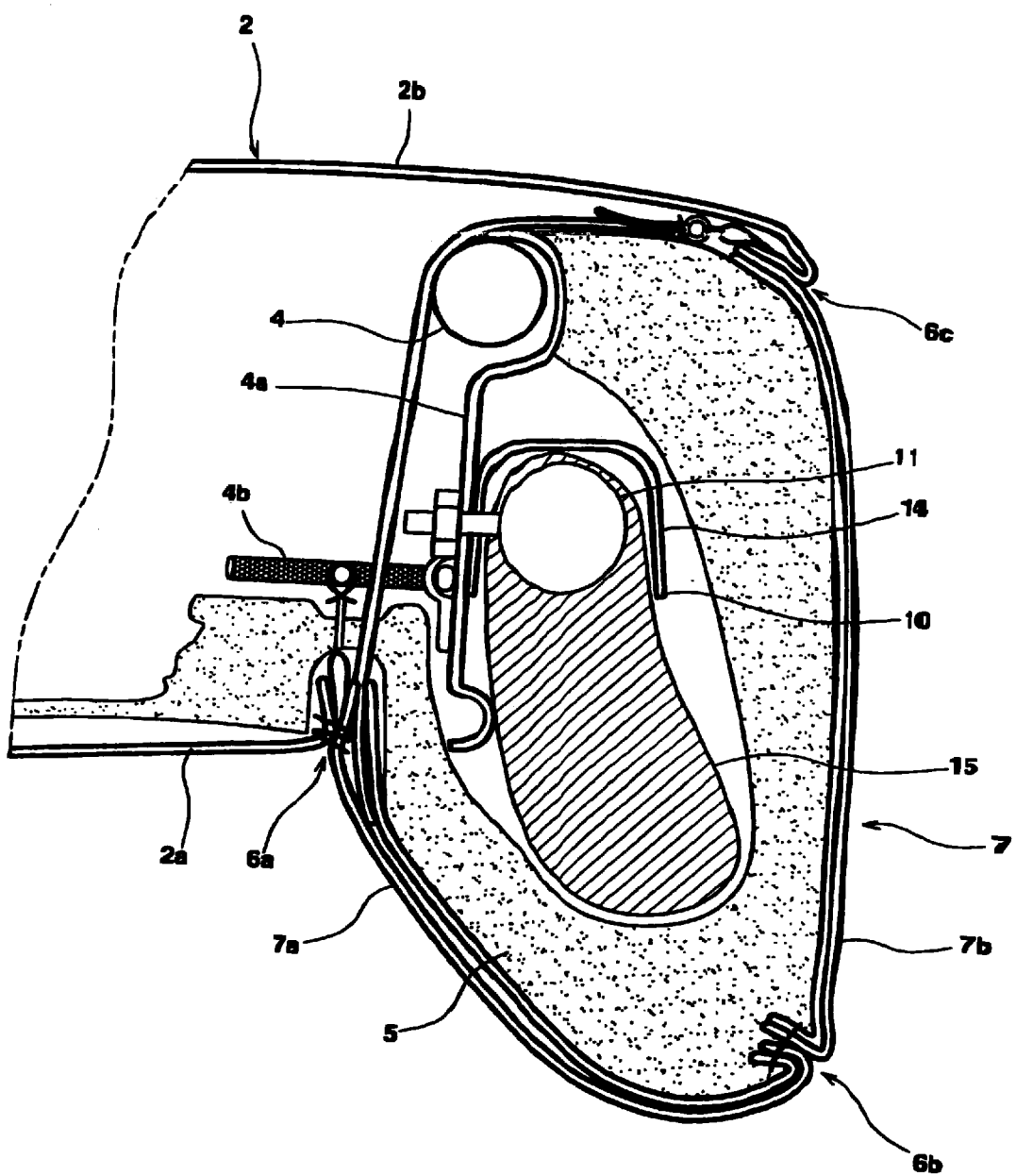
FIG. 2 is a sectional view taken along line C—C of FIG. 1.
Figure 3:
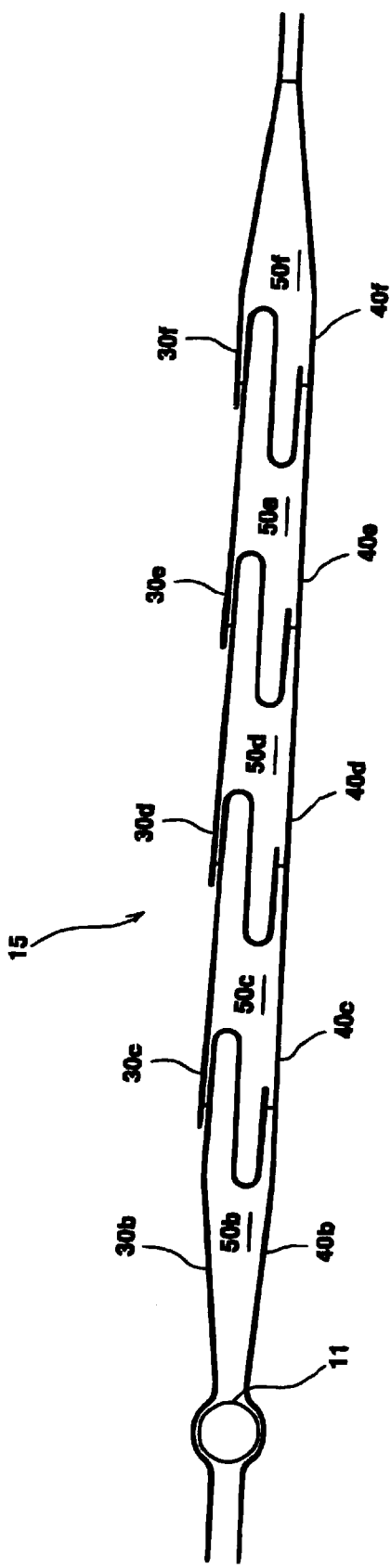
FIG. 3 is a simplified constructional section of an airbag cushion employed in the conventional side airbag system shown in FIG. 1.
Figure 4:
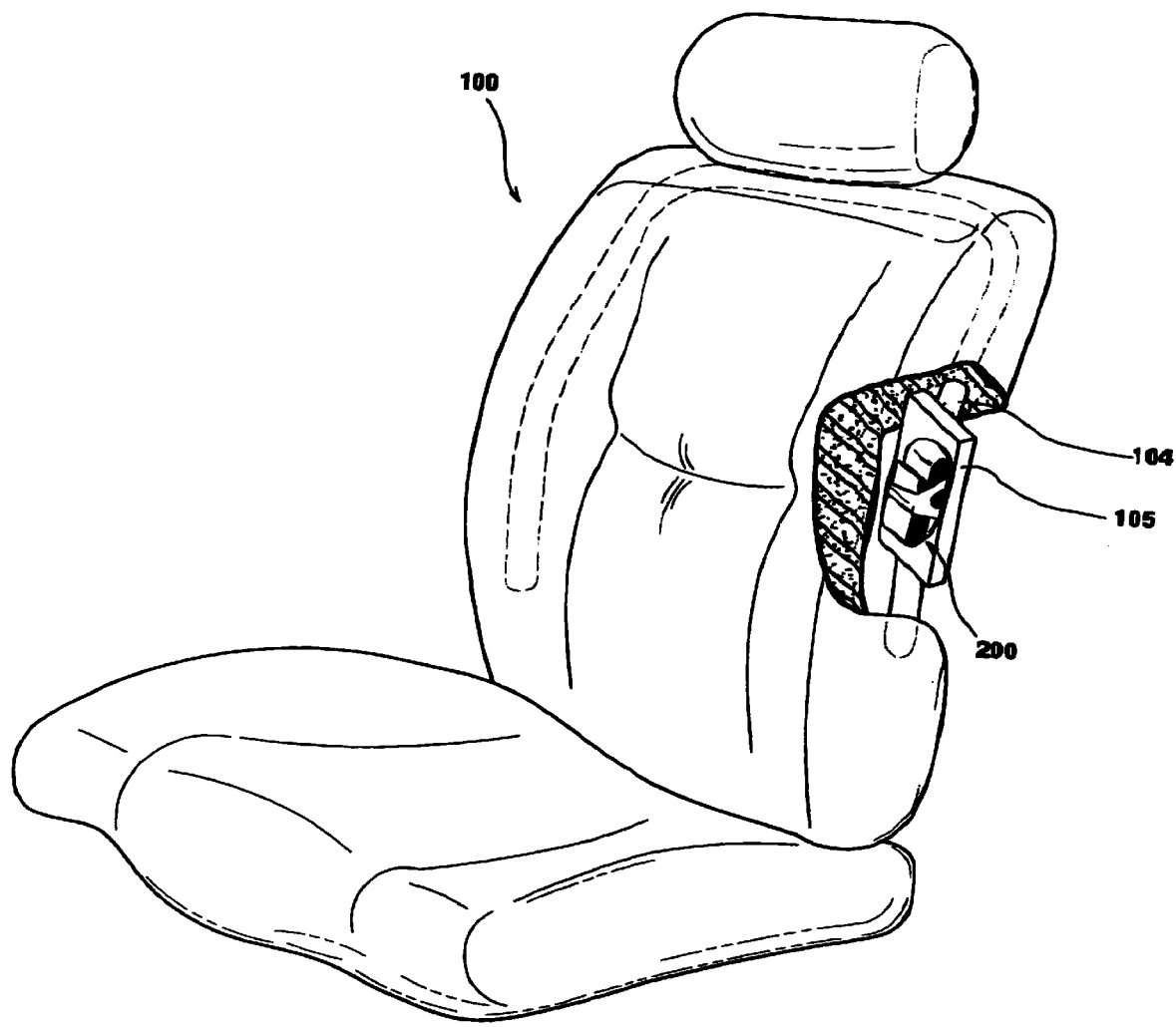
FIG. 4 is a schematic perspective view of a partly cut-out front seat having a side airbag system according to an embodiment of the present invention.

FIG. 4 schematically shows the construction of a side airbag system according to an embodiment of the present invention. In the side airbag system of the present invention as shown, a side impact airbag module 200 is installed at a fixing plate 105 of a frame 104 shaped as a pipe contained in a front seat 100 of an automobile. As shown, the side impact airbag module 200 is installed according to a conventional method for fixing the side airbag module.

Figure 5:
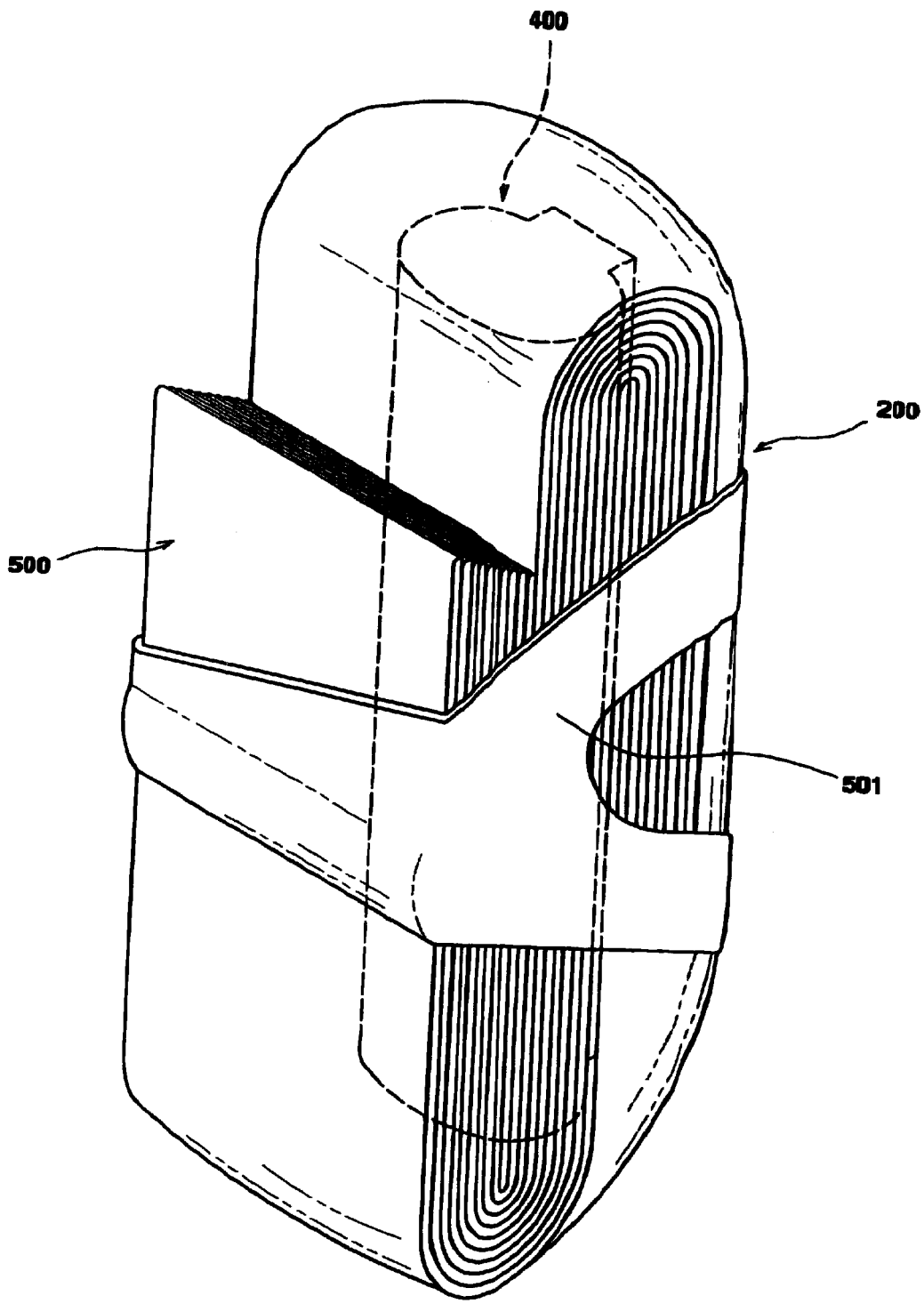
FIG. 5 is a schematic perspective view of a folded side impact airbag module installed in the airbag system shown in FIG. 1.
Figure 6:
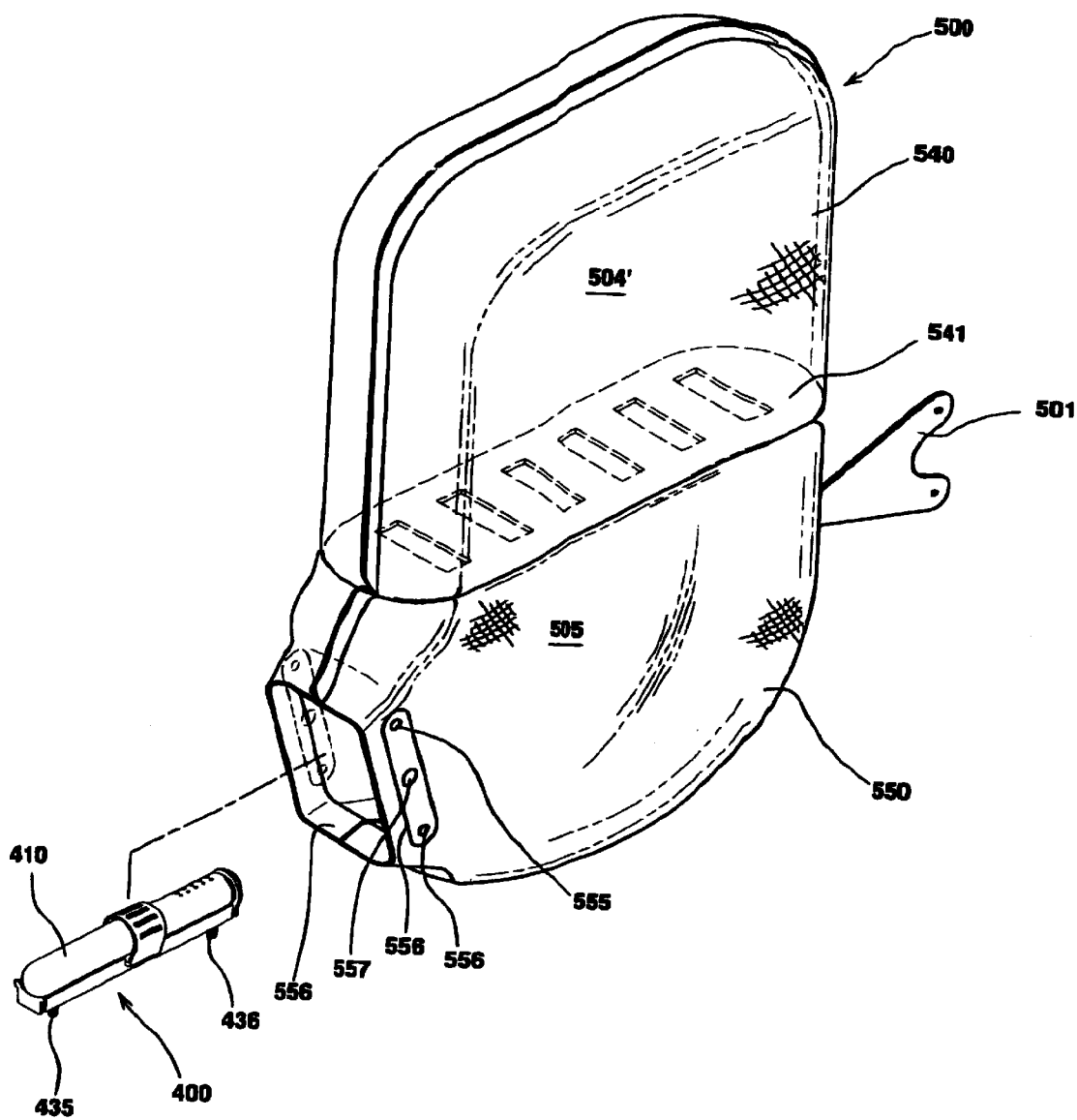
FIG. 6 is a schematic perspective view of a side impact airbag module of FIG. 5 in an inflated state.

As shown in FIGS. 5 and 6, the side impact airbag module 200 includes an airbag cushion 500 and an inflator assembly 400 contained in the airbag cushion 500.

The airbag cushion 500 is seamed by a flexible first panel 540 and a pair of second panels 550, and has an upper chamber 504 and a lower chamber 505 partitioned by a tether 541 which is a part of the first panel 540.

The airbag cushion 500 constructed as above is effectively inflated by a gas generated by inflator 410 of the inflator assembly 400. The airbag cushion 500 is surrounded by a cover 501 shaped as a letter "V".

The airbag cushion 500 has a mouth portion 559 formed at a portion of the second panels 550, and two bolt plates 558 are attached to the mouth portion 559. The mouth portion 559 has a section having a dimension increasing as it goes inward of the lower chamber 505. The inflator assembly 400 is located near the mouth portion 559 of the airbag cushion 500 when it is inflated. That is, when the inflator assembly 400 and the airbag cushion 500 are assembled together, the bolt plates 558 are arranged to be overlapped with each other, and the inflator assembly 400 is placed in the airbag cushion 500 adjacent to the mouth portion 559. Then, assembling bolts 435 and 436 of the inflator assembly 400 are inserted outward through bolt holes 555 and 556 of the overlapped bolt plates 558 of the airbag cushion 500. Thereafter, the assembling bolts 435 and 436 are respectively tightened by a nut (not shown) at a fixing position of the fixing plate 105. In this case, the inflator assembly 400 together with the airbag cushion 500 is fixed to the fixing plate 105.

Figure 7:
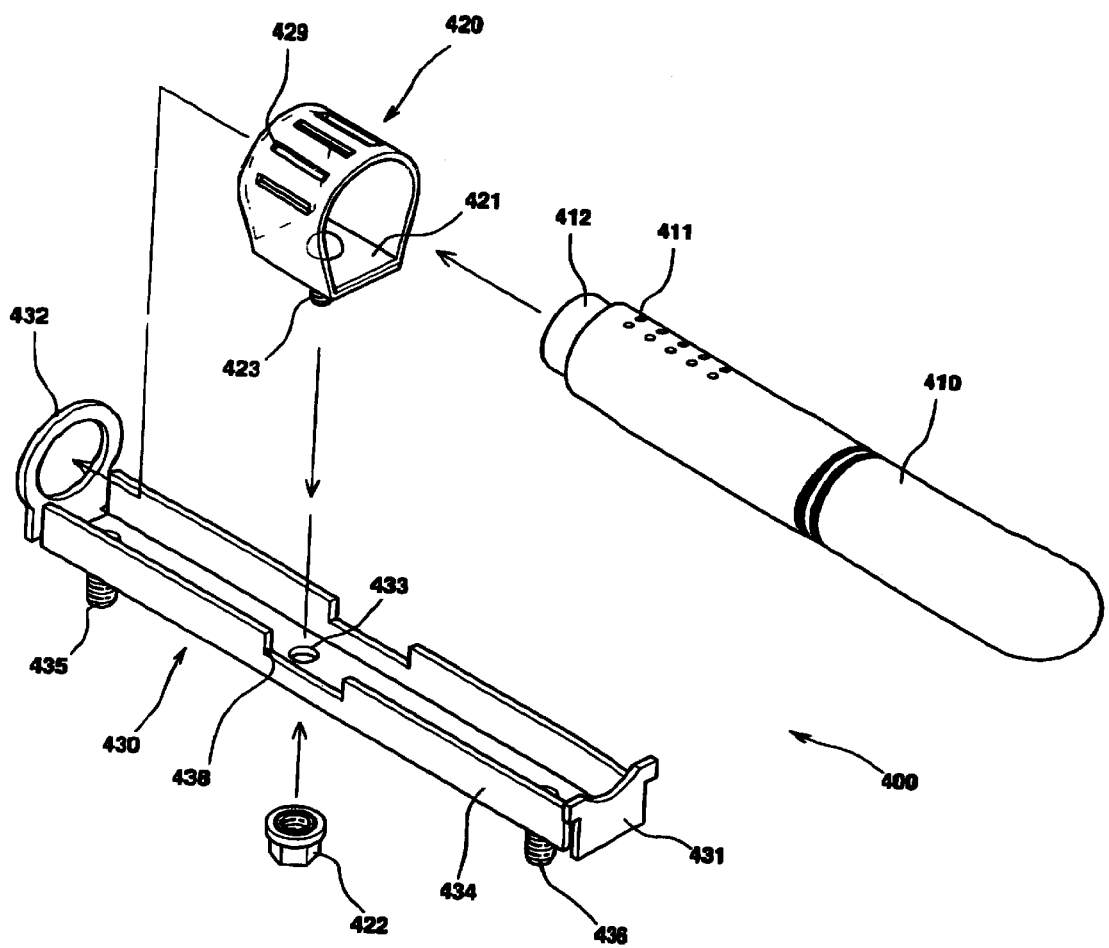
FIG. 7 is an exploded perspective view of an inflator assembly shown in FIG. 6.

As shown in FIG. 7, the inflator assembly 400 includes an inflator 410, a mounting ring 420, and a mounting bracket 430 respectively of a small size.

The inflator 410 has a shape of a very small and compact cylindrical bar and has a plurality of gas pores 411 formed at a cylindrical surface of the inflator 410. The functions of the inflator 410 are to ignite chemicals filled in the inflator 410 to generate gas and to inject the gas into the airbag cushion through the gas pores 411. Further, the inflator 410 has a fixing end 412 whose diameter is slightly smaller than the other portion of the inflator 410.

Since the inflator 410 having the above construction injects a large quantity of gas of high temperature and high pressure, the inflator 410 moves violently in axial and circumferencial directions.

The mounting ring 420 functions to fix the inflator 410 as above to the mounting bracket 430, and is made by winding a metal strip having a predetermined width and overlapping ends of the metal strip at a fixing surface 421 which constitutes an inner bottom of the mounting ring 420. The diameter or the dimension of the inner space of the mounting ring 420, which is defined by the wound metal strip, is slightly larger than the diameter of the inflator 410. The mounting ring 420 has a side section having a shape similar to a horse's hoof. Therefore, the inflator 410 can be easily inserted through and tightly fitted in the mounting ring 420.

The mounting ring 420 has a plurality of slits 429 formed at a wound upper surface of the mounting ring 420. The slits 429 are formed in such a manner that slit-shaped portions of the mounting ring 420 are cut slightly bent inward, so as to help the inflator 410 to be more suitably fitted in the mounting ring 420.

Further, at the fixing surface 421 of the mounting ring 420 is assembled an extension bolt 423 having a head and a screw portion. The screw portion of the extension bolt 423 protrudes downward from the fixing surface 421, and is tightened by a nut under the lower surface of the mounting bracket 430. The mounting ring 420 is pulled in a vertical direction of the mounting bracket 430. Thereafter, the screw portion of the extension bolt 423 is assembled with the fixing plate 105, so that the inflator 410 is fixed to the mounting bracket 430 together with the assembling bolts 435 and 436 described above.

Further, the mounting bracket 430 has a bolt hole 433, which the extension bolt 423 is inserted through and assembled with, formed at the center of a lower surface of the mounting bracket 430. The mounting bracket 430 has a length corresponding to an axial length of the inflator 410 and a width slightly smaller than the diameter of the inflator 410. The mounting bracket 430 has a shape of a rectangular box whose top is open. Also, the mounting bracket 430 has a retainer ring 432 assembled at one end and a retainer plate 431 assembled at the other end, and two rectangular cut-out portions 438 formed at both side walls 434. The retainer ring 432 is shaped as a ring, and the retainer plate 431 has an upper end cut out giving it a semi-circular shape.

In this case, the fixing end 412 of the inflator 410 is inserted in and assembled with the retainer ring 432, while the other end of the inserted inflator 410 is supported by the retainer plate 431. The upper ends of the side walls 434 provide contact areas for fixing the inflator 410 thereon in a stable manner. Moreover, the rectangular cut-out portions 438 have a width slightly larger than the width of the mounting ring 420, so as not to restrict vertical movements of the mounting ring 420, but to restrict axial movements of the inflator 410.

At the lower surface of the mounting bracket 430 constructed as above are assembled two assembling bolts 435 and 436 extending downward from the mounting bracket 430.

Hereinafter, described will be an assembled relation of the construction for fixing the inflator for a side airbag according to the present invention as described above in detail.

Firstly, the inflator 410 is loosely inserted in the mounting ring 420. In this case, the mounting ring 420 is located in the middle of the inflator 410. Then, the extension bolt 423 of the mounting ring 420 is inserted through the bolt hole 433 of the mounting bracket 430.

At this state, the fixing end 412 of the inflator 410 inserted in the mounting ring 420 is inserted in the retainer ring 432 of the mounting bracket 430, and the inflator 410 is in contact with the side walls 434 and the upper end of the retainer plate 431.

Thereafter, the extension bolt 423 is assembled with a nut 422, and the mounting ring 420 is received in the cut-out portions 438 of the mounting bracket 430.

Figure 8:
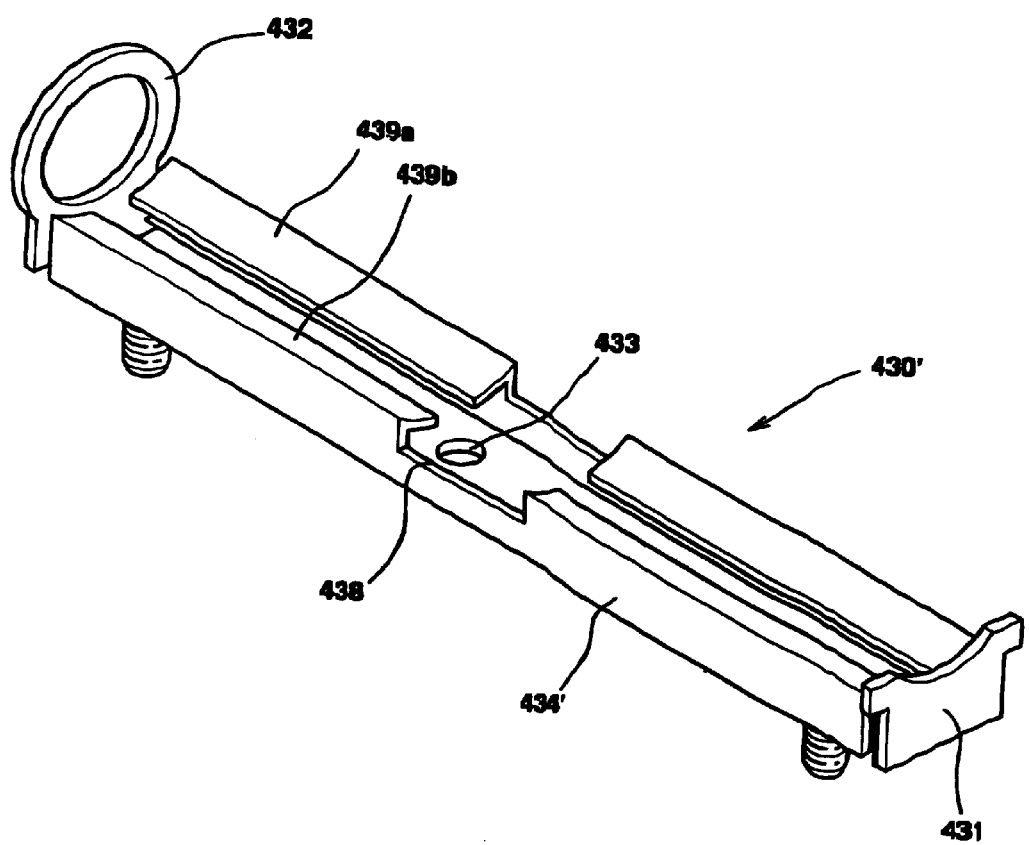
FIG. 8 is a perspective view of another mounting bracket which may be employed in an inflator assembly shown in FIG. 7.

As shown in FIG. 8, the mounting bracket 430' may have supporting plates 439a and 439b respectively bent inward from the upper ends of the side walls 434' and rounded with a predetermined curvature, so as to ensure more stable support of the inflator 410.

In this case, the entire surfaces of supporting plates 439a and 439b come into contact with the inflator 410 to thereby support the inflator 410 in a stable manner together with the retainer ring 432 and the retainer plate 431.

Figure 9:
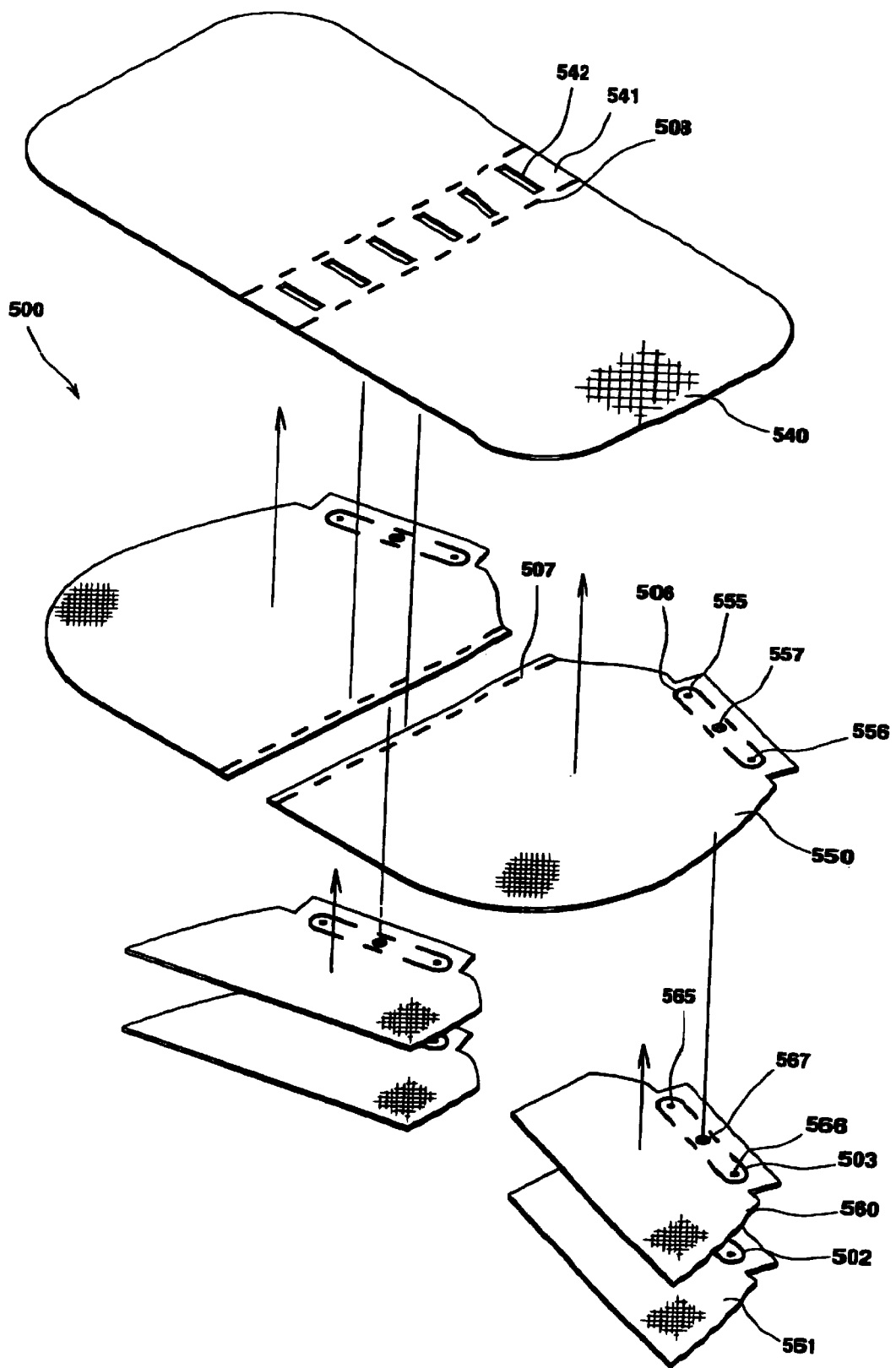
FIG. 9 is an exploded perspective view of panels employed in the side impact airbag module of FIG. 6.

FIG. 9 is an exploded perspective view of the airbag cushion 500, which includes the first panel 540, a pair of the second panels 550, and pairs of reinforcement panels 560 and 561 of the same shape.

The first panel 540 is so formed as to have a rectangular shape through a laser cutting. The first panel 540 may have a thickness and a density which are not restricted by the present invention, but employed in a general side airbag cushion. Instead, it is preferred that the first panel 540 is subjected to a surface treatment such as a coating, since the first panel 540 is a member which is in direct contact with a passenger's face. The surface treatment may decrease the impact applied to the passenger's head.

The first panel 540 includes the tether 541 having a plurality of vent slits 542 formed in parallel with predetermined intervals. The tether 541 maintains the shape of the airbag cushion 500 and controls the pressure in the airbag cushion 500. When the automobile experiences a collision, the tether 541 is bent or flexed by the passenger coming into collision with the airbag cushion 500, so as to increase or decrease the opening dimensions of the vent slits 542.

Moreover, the second panels 550 are symmetric to each other. Especially, the second panels 550 are subjected to a coating treatment so as to maintain the pressure in the lower chamber as described above, in the case of intending to decrease the impact applied to the passenger's thorax. That is, the second panels 550 are minutely woven by fine fibers, and fine gaps between the fine fibers are coated by means of coating material such as rubber, silicon, etc., so as to maintain an airtight surface. The second panels 550 as such have a plurality of the bolt holes 555, 556, and 557 for assembling the fixing bolts of the above described inflator assembly.

Further, the pairs of reinforcement panels 560 and 561 are also coated similarly to the second panels 550 and are cut by laser to have a contour coinciding with the contour of the second panels 550. Also, the reinforcement panels 560 and 561 respectively have an area smaller than that of each of the second panels 550 to reduce the weight. The reinforcement panels 560 and 561 have bolt holes 565, 566, and 567 corresponding to the bolt holes 555, 556, and 557 of the second panels 550.

The panels 540, 550, 560, and 561 are stacked together in the direction indicated by the dotted arrow line, and then are stitched along the seams 502, 503, 506, 507, and 508.

Hereinafter, described in detail will be a method for manufacturing an airbag cushion of the present invention.

Figure 10:
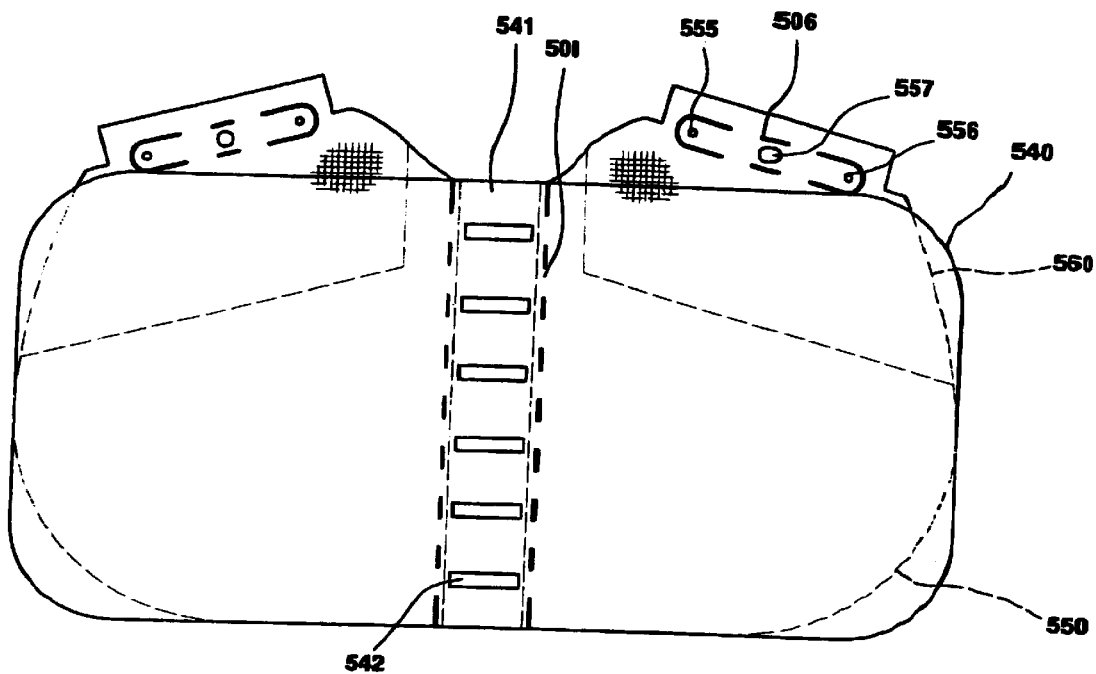
FIGS. 10 to 12 are plan and side views of the assembled panels shown in FIG. 9, for describing a method for manufacturing a side airbag system according to the present invention.

As shown in FIG. 10, in order to enable stitching in a flat plane, the panels 540, 550 and 560 are stacked in sequence.

In this case, the worker for the stitching task arranges the side ends of the panels 540, 550, and 560 to coincide with each other so that the tether 541 having the vent slits 542 is located at the middle portion. Then, the second panels 550 and the reinforcement panels 560 are symmetrically arranged. Thereafter, the first and the second panels 540 and 550 are stitched along the first seams 508 located at the middle portion.

Further, the stacked second panels 550 and the reinforcement panels 560 are stitched along the second seams 506. These second seams 506 not only reinforce the bolt plates 558 having the bolt holes 555, 556, and 557, but also more firmly fix the second panels 550 and the reinforcement panels 560 to each other.

Figure 11:
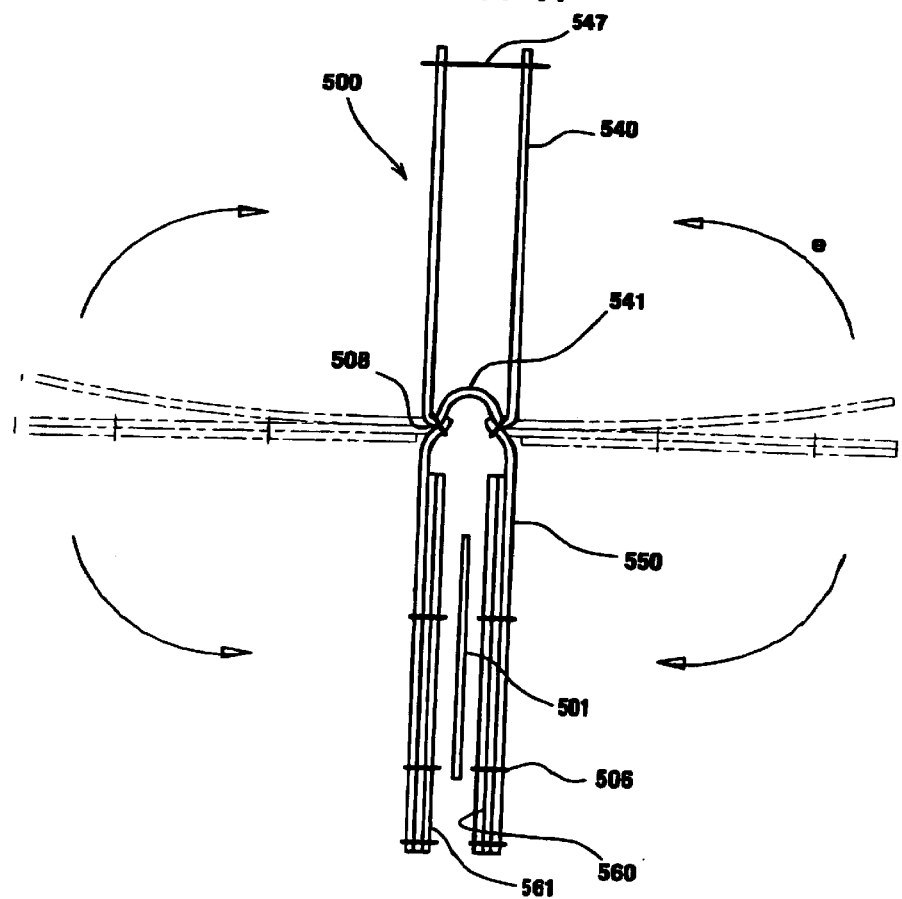

As shown in FIG. 11, the panels 540, 550, 560, and 561 seamed together as described above are unfolded in a vertical direction e to form a shape of a butterfly. That is, the worker unfolds the first panel 540 upward and the second panels 550 and the reinforcement panels 560 and 561 downward. Then, the tether 541 partitioned by the first seams 508 is located in the airbag cushion 500. The panels 540, 550, 560, and 561 unfolded as above and the first seams 508 disposed in a lateral direction are stitched along the third seam 547 arranged at the rim of the panels.

Figure 12:
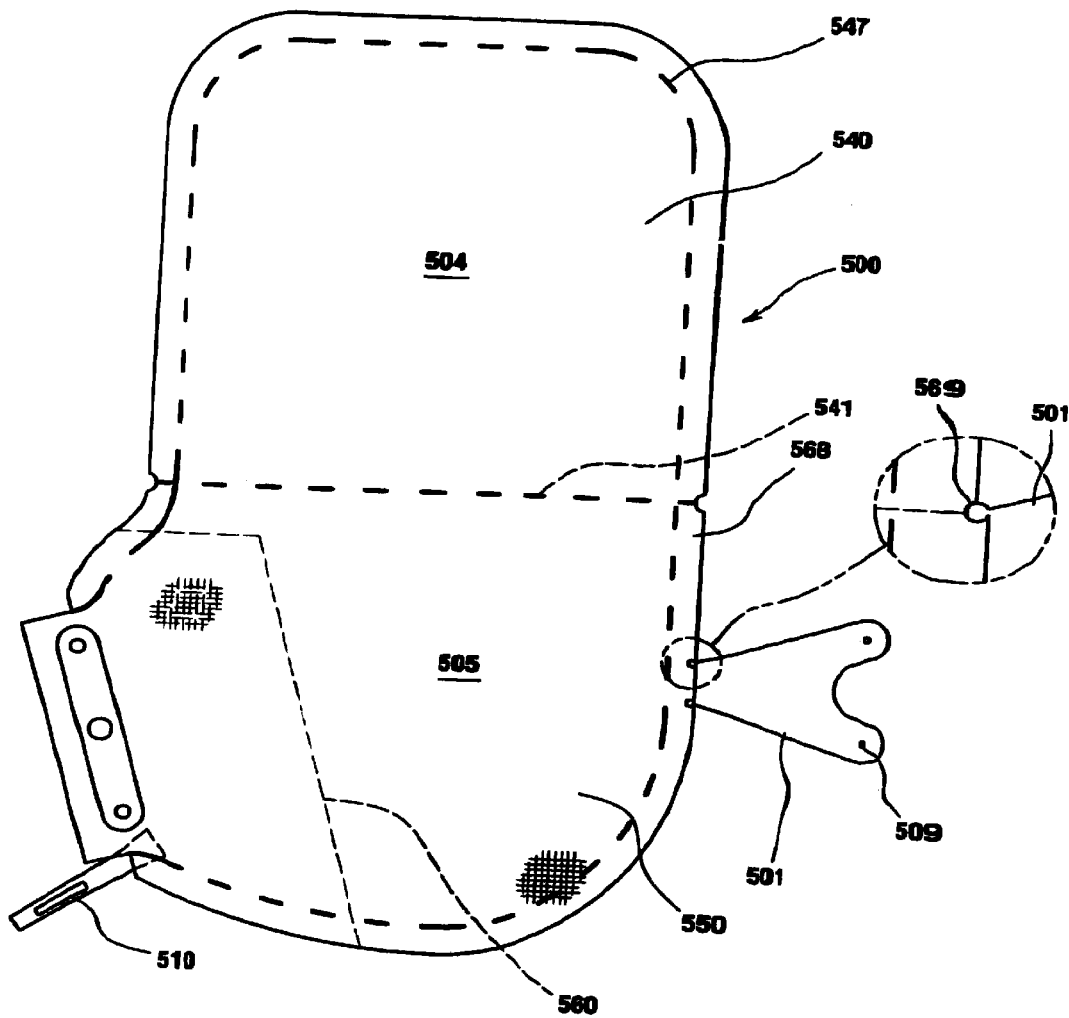

As shown in FIG. 12, the panels 540, 550, and 560 seamed along the third seam 547 partition the interior of the airbag cushion 500 into the upper chamber 504 and the lower chamber 505, and form a rim 568 shaped like a fin disposed at the periphery of the airbag cushion 500.

Especially, the cover 501 has hooking holes 509 respectively formed at each end of two arms of the "V" letter. Also, the cover 501 is assembled with cracks 569 formed at the seamed portion near the third seam 547, so that the cover 501 may be easily separated from the second panels 550 when the airbag cushion 500 is inflated by the gas pressure of the inflator.

In addition, at the second panels 550 is formed a bar code 510 for describing the goods of the airbag cushion 500.

By the above construction of the airbag cushion 500 employed in the side airbag system of the present invention, the stitching in a flat plane can be relatively effectively and easily performed in forming at least two chambers 504 and 505 and an integrated tether 541. That is, the present invention has overcome the problems of the prior art such that the panels must be turned inside out and that both ends of a panel, a middle portion of another panel, or a predetermined portion of a panel must be individually stitched, in order to stitch the tether.

Hereinafter, described in detail will be a method for folding the airbag cushion of the present invention.

Figure 13A:
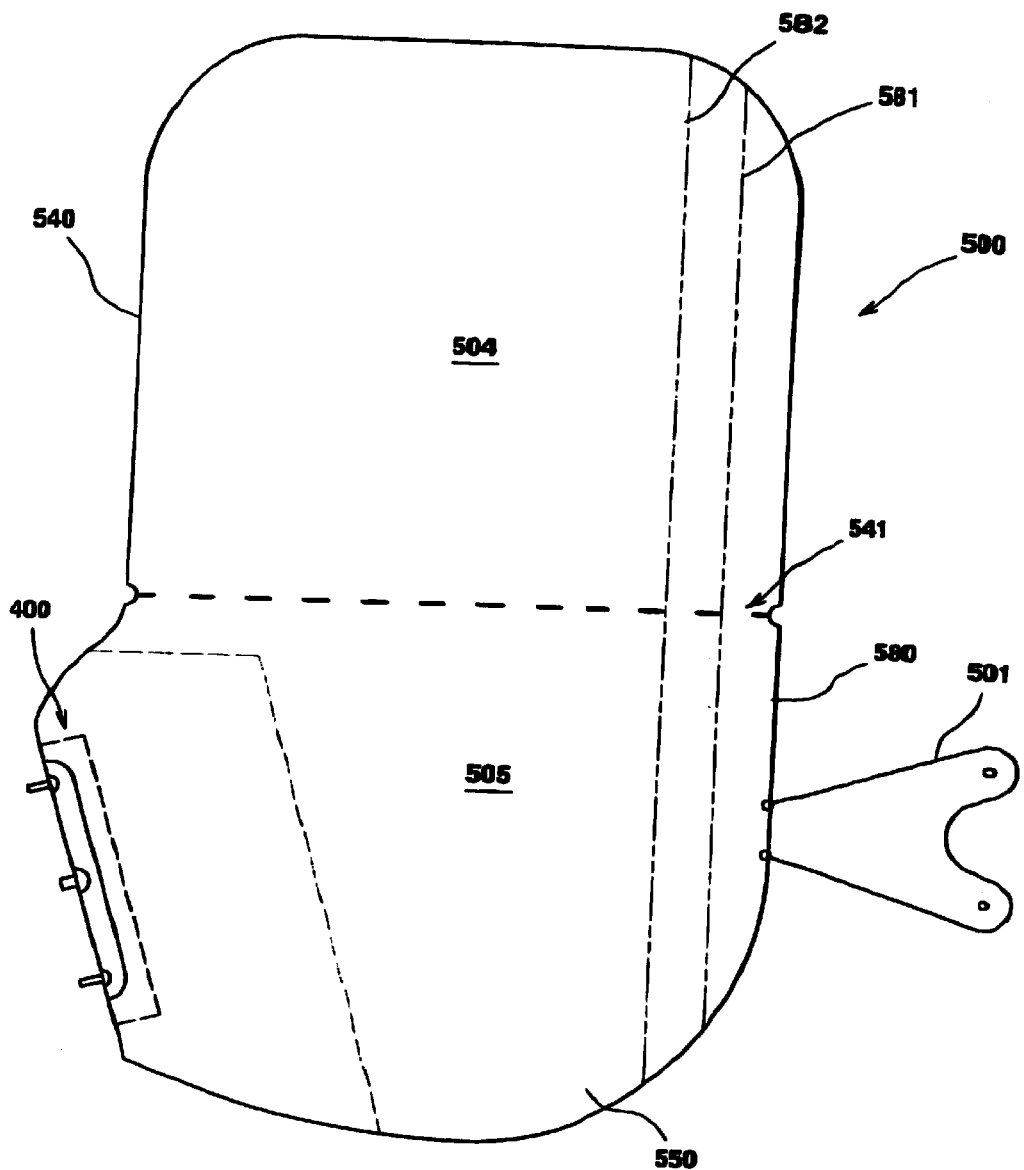
FIGS. 13A to 15B are front, plan and side views of an airbag cushion, for describing a method for folding the airbag cushion according to the present invention.
Figure 13B:
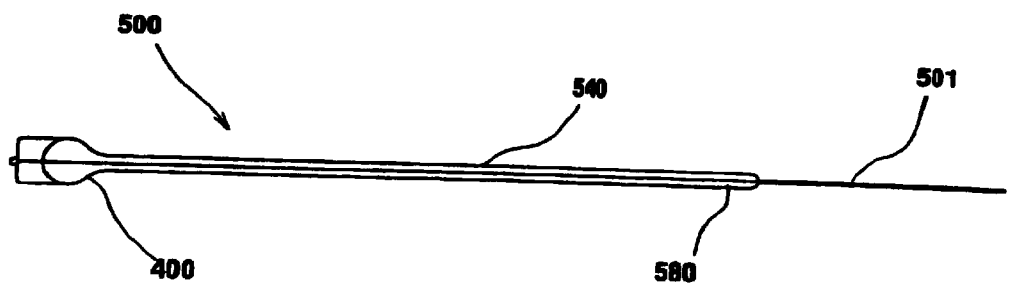

FIGS. 13A and 13B are respectively front and plan views for describing the method for folding the airbag cushion manufactured by the above described method.

At first, the inflator assembly 400 is assembled in the airbag cushion 500, and the first panel 540 is located at an upper portion and the second panels 550 are located at a lower portion with reference to the tether 541.

The airbag cushion 500 is folded in such a manner that the exploding force of the gas of high temperature and high pressure injected from the inflator assembly 400 can be firstly applied to the inner surface of the second panels 550 and to the inner surface of the first panel 540 also while the second panels 550 are unfolded to inflate the lower chamber 505.

Figure 14A:
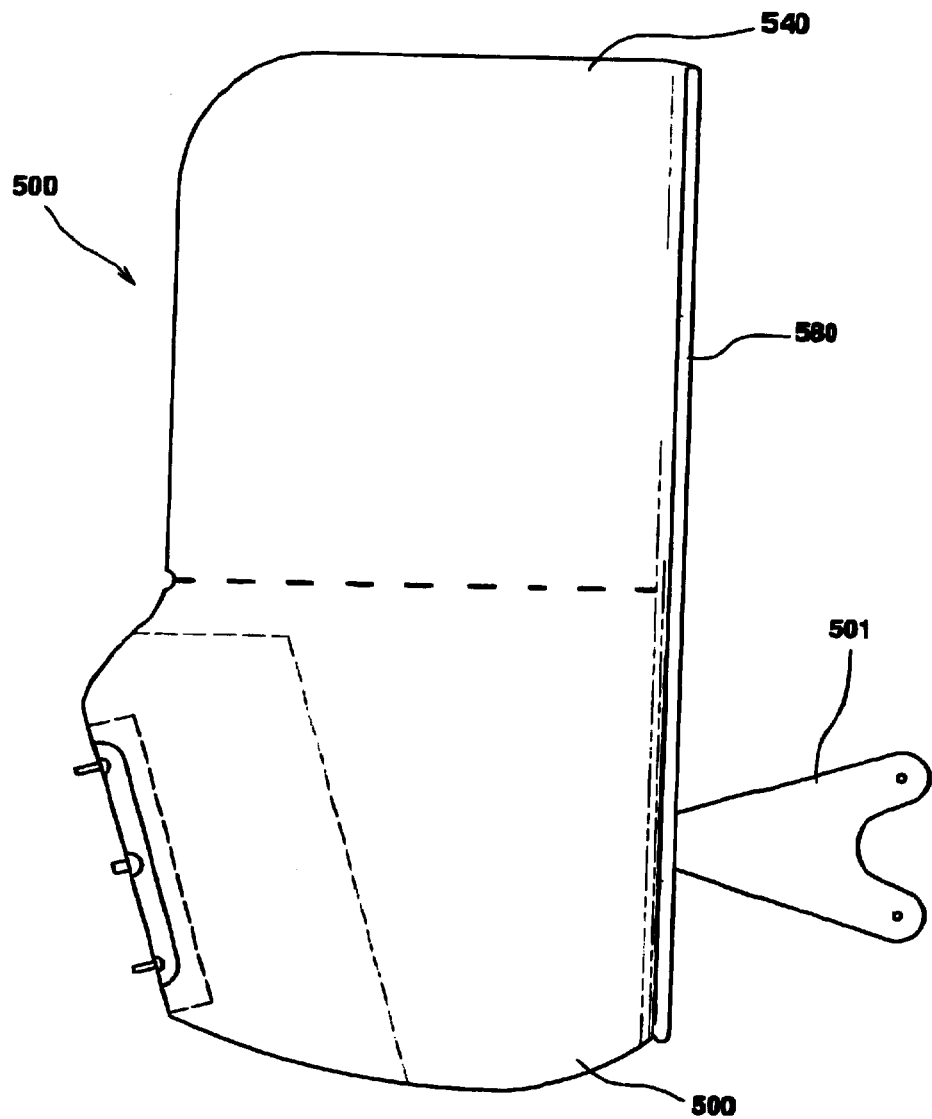
Figure 14B:
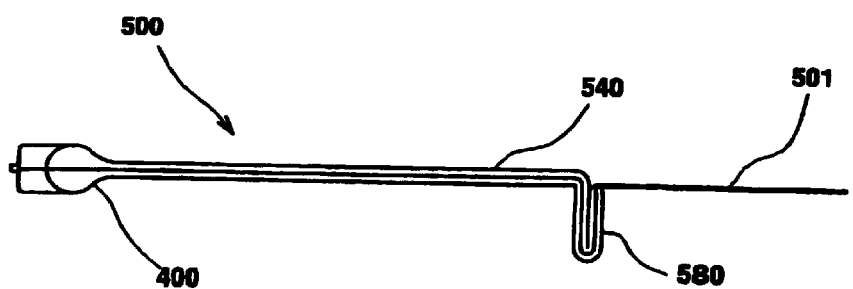

In other words, a right end 580 of the first panel 540 and the second panels 550 forming the airbag cushion 500 is folded at a right angle with reference to first and second folding lines 581 and 582, and then folded again in the opposite direction. Then, the right end 580 folded as above has a shape of the letter U as shown in FIGS. 14A and 14B.

Figure 15A:
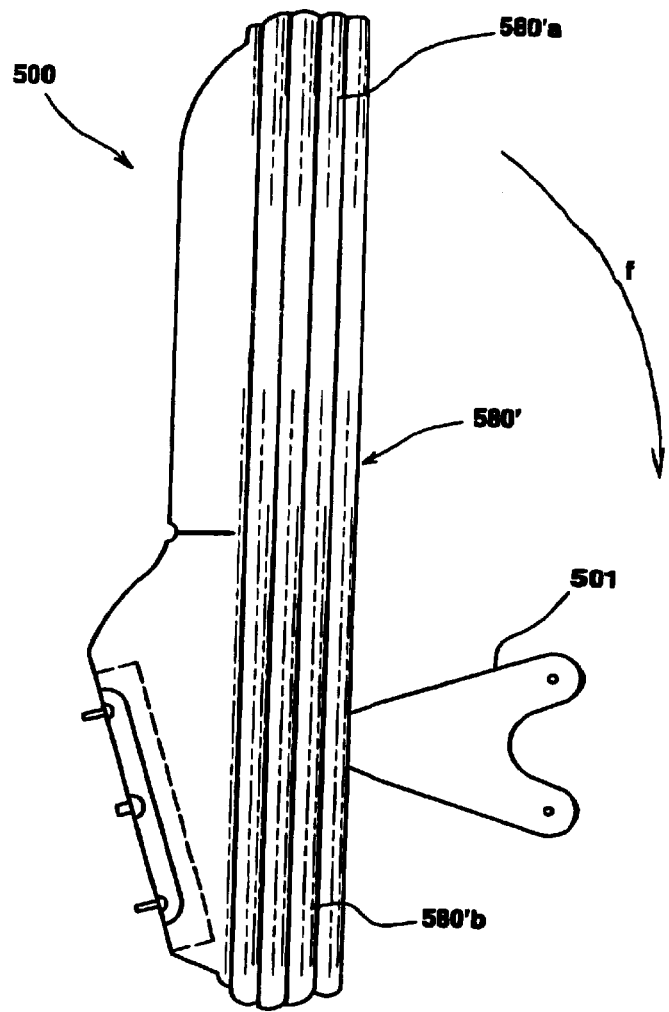
Figure 15B:
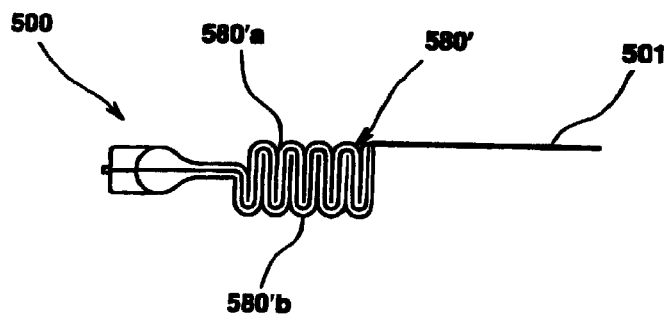

As shown in FIGS. 15A and 15B, when the first panel 540 and the second panels 550 are repeatedly folded in the same way as above, the airbag cushion 500 has a folded body 580' having a section of a shape including horizontally continuous "S" letters. Such folded body 580' is relatively very compact in the horizontal direction. Further, the folded body 580' as above exhibits a high operational efficiency because an upper body 580'a and a lower body 580'b can be unfolded nearly simultaneously.

Thereafter, the upper body 580'a is folded toward and overlapped with the lower body 580'b with reference to the middle portion.

Figure 16A:
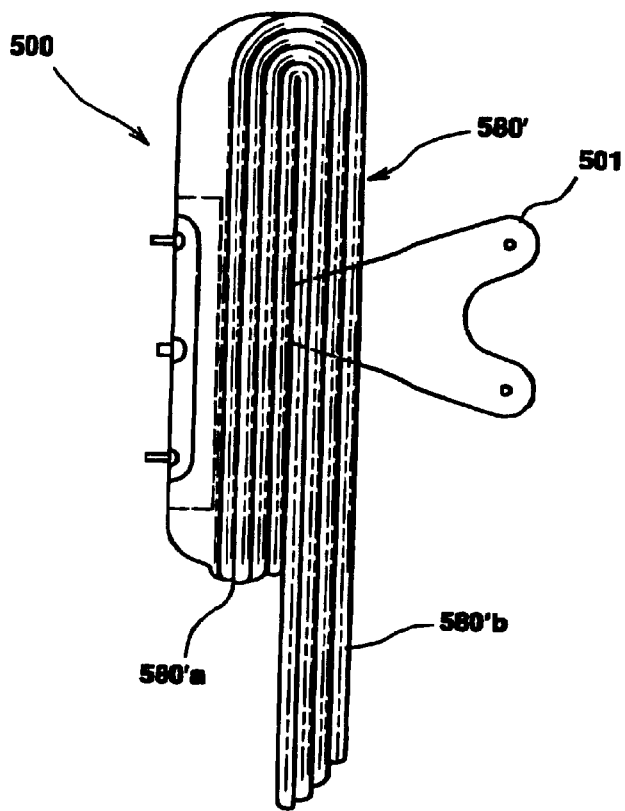
FIGS. 16A to 18B are front, plan and side views of an airbag cushion, for describing another method for folding the airbag cushion according to the present invention.
Figure 16B:
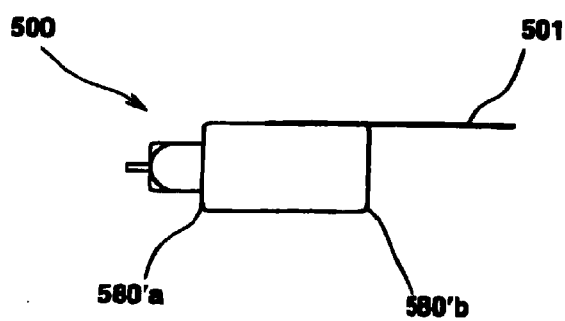

FIGS. 16A and 16B are respectively front and plan views of the airbag cushion 500 folded and overlapped as described above, in which the upper body 580'a and the lower body 580'b are oriented downward in the same direction.

Figure 17A:
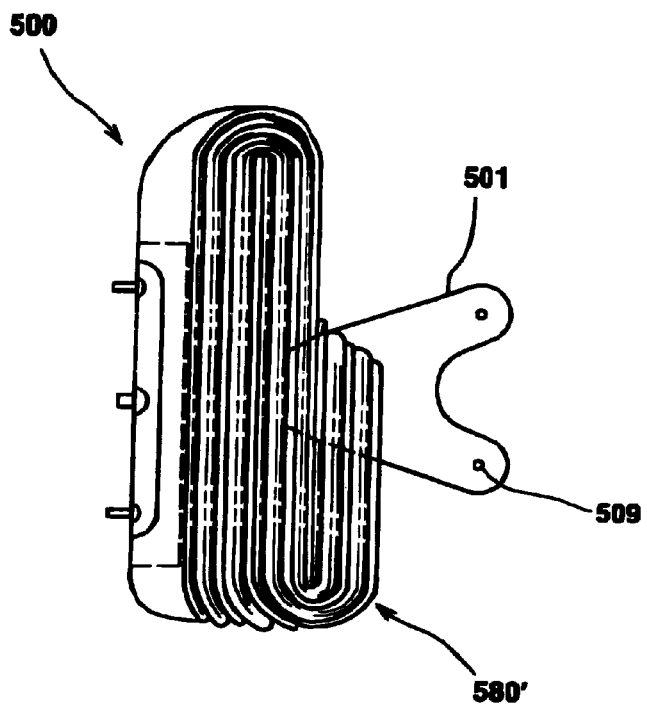
Figure 17B:
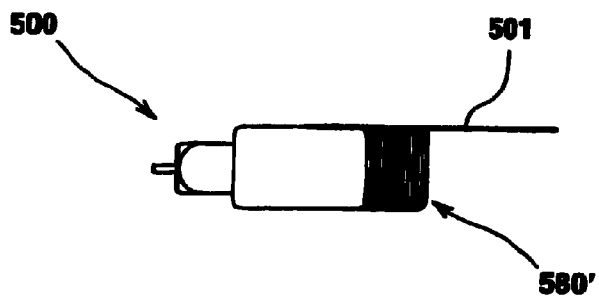

Further, as shown in FIGS. 17A and 17B, the upper body 580'a and the lower body 580'b are folded to be oriented upward again. In this case, the airbag cushion 500 has a further reduced thickness in the horizontal direction, and can be unfolded sequentially and effectively.

Figure 18A:
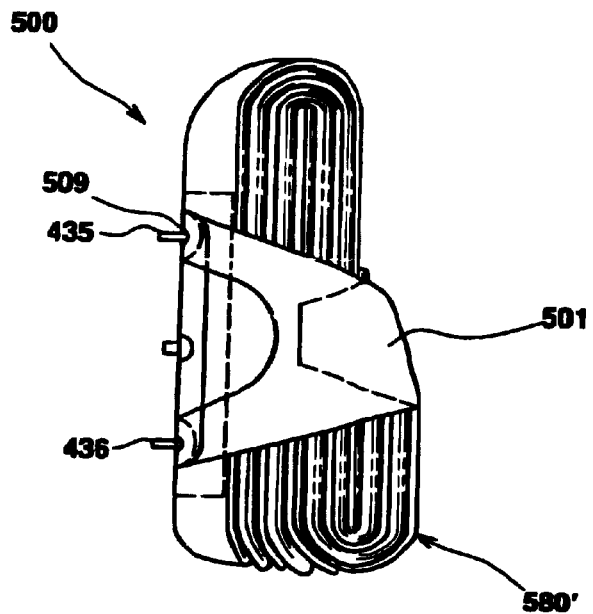
Figure 18B:
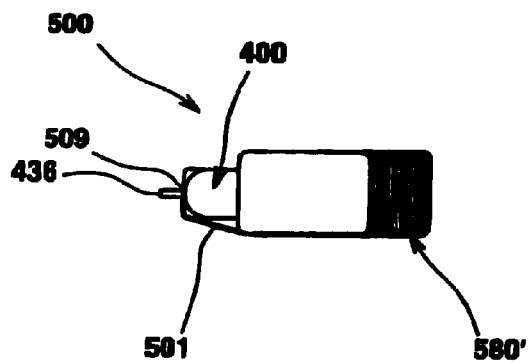

Furthermore, the cover 501 surrounds the folded body 580' in the horizontal direction, so as to make the folded body 580' more compact. In this case, the hooking holes 509 formed at the ends of the V-shaped cover 501 are fixedly assembled with the assembling bolts 435 and 436 of the inflator assembly 400 as shown in FIGS. 18A and 18B.

Therefore, when the inflator is operated, the side impact airbag module is unfolded in an order opposite to the above described order for folding the airbag cushion 500. That is, the cover 501 is separated from the folded body 580' by the inflation of the airbag cushion 500, and the upper body 580'*a* and the lower body 580'*b* are unfolded in a straight line. At the same time, the high pressure gas of the inflator inflates the lower chamber 505 as described above, while it passes through the vent slits 542 of the tether 541 to inflate the upper chamber 504.

In the side impact airbag module of the side airbag system of the present invention as described above, the upper chamber 504 is effectively inflated on the lower chamber 505 with which the passenger's thorax comes into contact.

As described above in detail, the side airbag system of the present invention has advantages, in that the manufacturing cost and the manufacturing steps can be reduced, since the system has a compact-sized side impact airbag module including an airbag cushion having an integrated tether obtained by stitching the panels in a flat plane and an inflator having a firm fixing construction.

Moreover, there is provided another advantage in that the working efficiency is improved in mass production, since the side airbag system of the present invention has an airbag cushion made by stitching the panels in a flat plane.

Further, in the side airbag system of the present invention, since the airbag cushion is folded in such a manner that an upper chamber is inflated on a lower chamber, the gas of high pressure and high temperature can be uniformly injected in an initial stage of operation. Therefore, the side airbag system of the present invention exhibits a superior performance of inflating.

Furthermore, in the case where the second panel defining the lower chamber and the reinforcement panels are subjected to a coating treatment, differently from the first panel made from an ordinary material to define the upper chamber, the pressure in the lower chamber can be maintained in a relatively stable manner, and the passenger's face to be in contact with the upper chamber can be safely protected.

In addition, in the side airbag system of the present invention, the introducing portion for the gas of high temperature and high pressure is not directly exposed to the gas, but protected by a plurality of reinforcement panels overlapped thereto. Therefore, the introducing portion is prevented from being melted or broken.

While there has been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention.

What is claimed is:

1. A side airbag system fixed to a frame comprising:
    an airbag cushion including:
        a first panel having a tether at a middle portion of the first panel, wherein the tether includes a plurality of vents;
        a pair of second panels seamed with the first panel along first seams at the middle portion of the first panel;
        reinforcement panels stacked directly below each of the second panels and seamed with each of the second panels along second seams of the second panels;
        a cover for surrounding the airbag cushion having:
            a "V" letter shape;
            two arms, each of the two arms having a hooking hole; and
            an end portion assembled with cracks formed at a seamed portion near a third seam,
                wherein the first panel, the pair of second panels and the reinforcement panels together with the cover are stitched along the third seam formed at rims of the panels, thereby forming an upper chamber and a lower chamber partitioned by the tether; and
        an inflator assembly, fixedly assembled with the hooking hole of each of the arms of the cover, the assembly comprising:
            an inflator;
            a mounting ring including (a) a lower chamber; (b) a winding metal strip of predetermined width having overlapping ends for support; and (c) an assembling means for attaching the lower chamber to the frame; and
            a mounting bracket having (a) two ends, (b) a retainer ring at one end, and (c) a retainer plate at the other end, wherein the inflator is securely mounted on the mounting bracket by the retainer ring and the retainer plate.

2. A side airbag system as claimed in claim 1, wherein the second panels are subjected to a coating treatment, so as to maintain a pressure of a gas in the lower chamber higher than a pressure in the upper chamber.

3. A side airbag system as claimed in claim 1, wherein the reinforcement panels are subjected to a coating treatment, so as to prevent the reinforcement panels from being deformed by the gas of high pressure and high temperature injected by the inflator.

4. A side airbag system as claimed in claim 1, wherein the vents formed on the tether are elongated slits, so that opening areas of the slits can be changed in the case of a collision.

5. A side airbag system as claimed in claim 1, wherein the mounting ring has a side section of a shape similar to a horse's hoof, so that the inflator can be easily inserted through and tightly fitted in the mounting ring.

6. A side airbag system as claimed in claim 1, wherein the mounting ring has a plurality of slits formed at a wound upper surface of the mounting ring, the slits being formed in such a manner that they are cut slightly bent inward, so as to help the inflator to be more suitably fitted in the mounting ring.

7. A side airbag system as claimed in claim 1, wherein the mounting bracket has a shape of a rectangular box whose top is open, the mounting bracket including a retainer ring assembled at a first end and a retainer plate assembled at a second end, and two side walls extending between the retainer ring and the retainer plate, the two side walls respectively having a rectangular cut-out portion.

8. A side airbag system as claimed in claim 7, wherein the mounting bracket has supporting plates respectively bent inward from upper ends of the side walls and rounded with a predetermined curvature, so as to ensure stable support of the inflator.

9. A method of manufacturing an airbag cushion for a side airbag system, the method comprising:

- stacking a first panel having a tether at the center of the first panel, a pair of second panels, and a pair of reinforcement panels in sequence so that all the side ends of the panels coincide;
- symmetrically arranging the pair of second panels with the pair of reinforcement panels;
- stitching the first panel to the pair of second panels along a first seam at a midde portion of the first panel;
- stitching the pair of second panels and the pair of reinforcement panels along a second seam on the pair of second panels;
- folding the first panel upward;
- folding the pair of second panels and the pair of reinforcement panels downward; and
- stitching the first panel, the pair of second panels, and the pair of reinforcement panels along a third seam at a periphery of the side airbag system, following the folding the first panel upward and the folding the pair of second panels and the pair of reinforcement panels downward.

10. A method of claim 9 comprising:

- folding the first panel, the pair of second panels, and the pair of reinforcement panels repeteadly in a zigzag manner along the first and second lines;
- forming a folded body having:
  - a continuous "S" coil-like shape;
  - an upper body; and
  - a lower body;
- folding the upper body of the folded body toward the lower body so the upper body is folded and overlapped with the lower body; and
- surrounding the overlap of the upper body and the lower body with a cover.

* * * * *